US012041898B2

(12) United States Patent  
Romine et al.

(10) Patent No.: US 12,041,898 B2  
(45) Date of Patent: Jul. 23, 2024

(54) AIR FLOW SYSTEMS AND METHODS FOR HORTICULTURE RACKS

(71) Applicant: Pipp Mobile Storage Systems, Inc., Walker, MI (US)

(72) Inventors: Daniel Romine, Riverside, CA (US); Darin Siples, Highland, CA (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 0 days.

(21) Appl. No.: 18/157,436

(22) Filed: Jan. 20, 2023

(65) Prior Publication Data

US 2023/0148490 A1 May 18, 2023

Related U.S. Application Data

(63) Continuation of application No. 17/717,411, filed on Apr. 11, 2022, now Pat. No. 11,582,920.

(60) Provisional application No. 63/173,137, filed on Apr. 9, 2021.

(51) Int. Cl.
*A01G 9/26* (2006.01)
*A01G 9/02* (2018.01)
*F24F 7/007* (2006.01)

(52) U.S. Cl.
CPC .............. *A01G 9/26* (2013.01); *A01G 9/023* (2013.01); *F24F 7/007* (2013.01)

(58) Field of Classification Search
CPC . A01G 9/18; A01G 9/24; A01G 9/245; A01G 9/246; A01G 31/00; A01G 31/02; A01G 31/06; A01G 1/031; A01K 1/0058; A01K 1/0064; A01K 1/0076; F24F 7/007
See application file for complete search history.

(56) References Cited

U.S. PATENT DOCUMENTS

| 2,034,995 | A | 3/1936 | Sibley |
| 3,307,469 | A | 3/1967 | Bohanon |
| 3,348,922 | A | 10/1967 | Bose et al. |

(Continued)

FOREIGN PATENT DOCUMENTS

| CN | 202738498 | 2/2013 |
| CN | 105830772 | 8/2016 |

(Continued)

OTHER PUBLICATIONS

Video screenshots from "Vertical Farms | Design and Innovation | TakePart", downloaded from https://www.youtube.com/watch?v=KARAIPpNWYI, believed to have been published Aug. 9, 2016.

(Continued)

*Primary Examiner* — Kristen C Hayes
(74) *Attorney, Agent, or Firm* — Gardner, Linn, Burkhart & Ondersma LLP

(57) ABSTRACT

An air flow system for a horticulture application is configured to facilitate simplified, reconfigurable air flow. Via use of adaptable and reconfigurable inlet ports, outlet ports, and a number and/or configuration of ventilation socks, the air flow system may be customizable to each respective application and/or produce increased plant density and/or health in horticultural applications. The ventilation socks may be disposed along rows of plants. The air flow system may be locally mounted to a scaffold system.

20 Claims, 10 Drawing Sheets

(56) References Cited

U.S. PATENT DOCUMENTS

| | | | |
|---|---|---|---|
| 3,474,720 A | 10/1969 | Qualley et al. | |
| 3,648,591 A | 3/1972 | Winnet | |
| 3,810,327 A | 5/1974 | Giansante | |
| 3,956,852 A | 5/1976 | Ceausescu et al. | |
| 4,030,518 A | 6/1977 | Wilcox | |
| 4,292,762 A | 10/1981 | Fogg et al. | |
| 4,505,066 A | 3/1985 | Moore | |
| 4,589,476 A | 5/1986 | Berner | |
| 5,123,595 A * | 6/1992 | Doss | F24F 12/001 454/306 |
| 5,358,444 A | 10/1994 | Helm et al. | |
| 5,493,808 A | 2/1996 | Munday | |
| 5,746,653 A | 5/1998 | Palmer et al. | |
| 5,915,620 A * | 6/1999 | Doss | A01K 1/0076 237/46 |
| 6,205,704 B1 | 3/2001 | Schmitz et al. | |
| 6,578,319 B1 | 6/2003 | Cole et al. | |
| 8,448,379 B2 | 5/2013 | Igarashi | |
| 8,468,741 B2 | 6/2013 | Lewis | |
| 9,010,019 B2 | 4/2015 | Mittelmark | |
| 9,161,498 B1 | 10/2015 | Shelor | |
| 9,241,453 B1 | 1/2016 | Martin et al. | |
| 9,480,207 B2 | 11/2016 | Tanase et al. | |
| 9,974,252 B2 | 5/2018 | Aykroyd et al. | |
| 10,058,041 B2 | 8/2018 | Hanzawa et al. | |
| 10,212,914 B1 * | 2/2019 | Reynolds | F24F 13/32 |
| 10,292,346 B2 | 5/2019 | Gallant | |
| 10,306,847 B2 | 6/2019 | Whitcher et al. | |
| 10,477,779 B2 | 11/2019 | Hutzel | |
| 10,602,677 B2 | 3/2020 | Gomi | |
| 10,667,472 B2 | 6/2020 | Muanchart | |
| 10,674,680 B2 * | 6/2020 | Hutto | F24F 8/192 |
| 10,694,682 B2 | 6/2020 | Bogner et al. | |
| 10,806,099 B2 | 10/2020 | Bogner et al. | |
| 10,866,886 B2 | 12/2020 | Millar | |
| 11,632,915 B2 | 4/2023 | Bogner et al. | |
| 11,641,810 B2 | 5/2023 | Bogner et al. | |
| 2004/0194371 A1 | 10/2004 | Kinnis | |
| 2004/0251122 A1 | 12/2004 | Goswami | |
| 2008/0086981 A1 | 4/2008 | Kilkis et al. | |
| 2008/0172935 A1 | 7/2008 | Feng | |
| 2010/0126063 A1 | 5/2010 | Emoto | |
| 2010/0275512 A1 | 11/2010 | Nien | |
| 2011/0192082 A1 | 8/2011 | Uchiyama | |
| 2011/0302838 A1 | 12/2011 | Chen et al. | |
| 2012/0311926 A1 | 12/2012 | Mittlemark | |
| 2013/0000185 A1 | 1/2013 | Tanase et al. | |
| 2013/0305601 A1 | 11/2013 | Park | |
| 2014/0112648 A1 | 4/2014 | Reinders et al. | |
| 2014/0260131 A1 | 9/2014 | Burkhauser | |
| 2014/0318012 A1 | 10/2014 | Fujiyama | |
| 2015/0007495 A1 | 1/2015 | Tseng et al. | |
| 2015/0230416 A1 | 8/2015 | Lo | |
| 2016/0007544 A1 | 1/2016 | Takashima et al. | |
| 2016/0057944 A1 | 3/2016 | Smits et al. | |
| 2016/0157447 A1 | 6/2016 | Hanzawa et al. | |
| 2016/0242372 A1 | 8/2016 | Wong et al. | |
| 2016/0324089 A1 | 11/2016 | Miyabe et al. | |
| 2017/0142912 A1 | 5/2017 | Gasmer et al. | |
| 2018/0035624 A1 | 2/2018 | Itoh et al. | |
| 2018/0125016 A1 * | 5/2018 | Dufresne | A01G 9/1423 |
| 2018/0213735 A1 | 8/2018 | Vail et al. | |
| 2018/0368336 A1 | 12/2018 | Erickson et al. | |
| 2019/0261587 A1 | 8/2019 | Abe et al. | |
| 2019/0289794 A1 | 9/2019 | Matsumura et al. | |
| 2019/0327906 A1 * | 10/2019 | Anderson | A01G 7/045 |
| 2020/0214228 A1 | 7/2020 | Cho et al. | |
| 2023/0255150 A1 | 8/2023 | Bogner et al. | |
| 2023/0270052 A1 | 8/2023 | Bogner et al. | |

FOREIGN PATENT DOCUMENTS

| | | | |
|---|---|---|---|
| JP | 2009273481 | 11/2009 | |
| JP | 5696848 | 3/2013 | |
| JP | 2013051942 | 3/2013 | |
| JP | 2013188190 | 9/2013 | |
| JP | 2014014285 | 1/2014 | |
| JP | 2016202110 | 12/2016 | |
| JP | 2016208948 | 12/2016 | |
| JP | 2017127302 | 7/2017 | |
| KR | 20010095493 | 11/2001 | |
| KR | 20030027362 | 4/2003 | |
| KR | 20070117035 | 12/2007 | |
| KR | 101222399 | 1/2013 | |
| KR | 101531385 | 6/2015 | |
| KR | 20150003480 | 9/2015 | |
| KR | 20160111766 | 9/2016 | |
| RU | 2070783 | 12/1996 | |
| WO | 9830078 | 7/1998 | |
| WO | 2011028100 | 3/2011 | |
| WO | 2013170361 | 11/2013 | |
| WO | 2015140493 | 9/2015 | |
| WO | WO-2015140493 A1 * | 9/2015 | A01G 31/02 |
| WO | 2017024079 | 2/2017 | |
| WO | 2018135296 | 7/2018 | |
| WO | 2019040863 | 2/2019 | |

OTHER PUBLICATIONS

Decision Granting Institution of Inter Partes Review, Case No. IPR2022-00893, dated Oct. 27, 2022.

Final Written Decision on Inter Partes Review of U.S. Pat. No. 10,806,099, Case No. IPR2022-00893, dated Oct. 27, 2023.

2013 ASHRAE Handbook—Fundamentals, pp. 21.18-21.19.

2015 ASHRAE Handbook—Heating, Ventilating, and Air-Conditioning Applications, pp. 8.4, 24.10, 24.14, 60.1.

2016 ASHRAE Handbook—Heating, Ventilating, and Air-Conditioning Systems and Equipment, pp. 4.12, 20.5.

Chris Beytes, Ed., "Ball Redbook Greenhouses and Equipment, vol. 1," Ball Publishing, 18th Edition, 2011.

TRANE Catalog "Performance Climate Changer Air Handlers Sizes 3-120 Indoor and Outdoor Units Application and Performance Information," document is labeled with a date of Sep. 2013.

Carrier, "Comfort Multi-family Hom Fan Coil FMA4," document is labeled with a copyright date of 2022, and is understood to have been downloaded on or about Apr. 12, 2022.

Hengda Perforated Metal Factory, "Perforated Ducting," document is undated, and is understood to have been downloaded on or about Apr. 12, 2022.

Hutto, U.S. Appl. No. 62/541,423, filed Aug. 4, 2017. U.S. Pat. No. 10,674,680 states a priority claim to U.S. Appl. No. 62/541,423.

Hutto, U.S. Appl. No. 62/658,355, filed Apr. 16, 2018. U.S. Pat. No. 10,674,680 states a priority claim to U.S. Appl. No. 62/658,355.

International Search Report and Written Opinion of the International Searching Authority from Patent Cooperation Treaty (PCT) Application No. PCT/US2022/024229, mailed Jul. 19, 2022.

* cited by examiner

AIR FLOW SYSTEMS AND METHODS FOR HORTICULTURE RACKS

CROSS-REFERENCE TO RELATED APPLICATIONS

This application is a continuation of U.S. Ser. No. 17/717,411, filed on Apr. 11, 2022, now U.S. Pat. No. 11,582,920 entitled "AIR FLOW SYSTEMS AND METHODS FOR HORTICULTURE RACKS." U.S. patent application Ser. No. 17/717,411 claims priority to and the benefit of U.S. provsional application, Ser. No. 63/173,137 entitled "AIR FLOW SYSTEMS AND METHODS FOR HORTICULTURE SCAFFOLDING SYSTEMS" filed on Apr. 9, 2021. Each of the foregoing applications is incorporated herein by reference, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to air delivery, and in particular to air flow systems and methods utilized in connection with horticulture applications.

BACKGROUND

In order to obtain optimum growth, plants release water vapor into the air to be evaporated, allowing them to absorb the water found in the growing media. Moving the air and creating a current encourages this transpiration process. Additionally, plants require carbon dioxide ($CO_2$) to breathe and engage in photosynthesis. Poor airflow may result in a deficiency in $CO_2$, as well as other environmental issues affecting the plant canopy, so the plant cannot properly transpire and metabolize. Accordingly, improved air flow systems and methods, including for horticulture applications, remain desirable.

SUMMARY

In an exemplary embodiment, an air flow system, comprises a manifold, a fan coupled to the manifold, and a ventilation sock coupled to the manifold. In another exemplary embodiment, a scaffold system for horticulture comprises: a row of racks, and an air flow system coupled to the row of racks, the air flow system comprising a manifold, a fan, and a ventilation sock.

In another exemplary embodiment, a method for providing airflow to a plant comprises coupling a manifold of an airflow system to a horticulture rack, coupling a fan to the manifold, coupling a ventilation sock to the manifold, passing a metal wire through a series of loops on the ventilation sock to suspend the ventilation sock from the horticulture rack, and operating the fan to circulate air through the ventilation sock and deliver the air to plants disposed on the horticulture rack.

The foregoing features and elements can be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. The contents of this section are intended as a simplified introduction to the disclosure and are not intended to limit the scope of any claim.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for racking, storage, and/or shelving systems, modular horticulture, lighting, irrigation, ventilation, drainage systems, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical customizable horticulture racking system, scaffolding system, airflow components, and/or related methods of use.

Principles of the present disclosure may be compatible with and/or may be utilized in connection with principles disclosed in U.S. Ser. No. 16/802,036 filed on Feb. 2, 2020, now U.S. Pat. No. 11,304,525 entitled "Customizable Slidable Shelving and Support System for Horticulture Applications." Additionally, principles of the present disclosure may be compatible with and/or may be utilized in connection with principles disclosed in U.S. Ser. No. 17/471,955 filed on Sep. 10, 2021, now U.S. Patent Application Publication No. 2022-0098881 entitled "Configurable Scaffolding System." The disclosure of each of the foregoing applications is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

Figure 1:
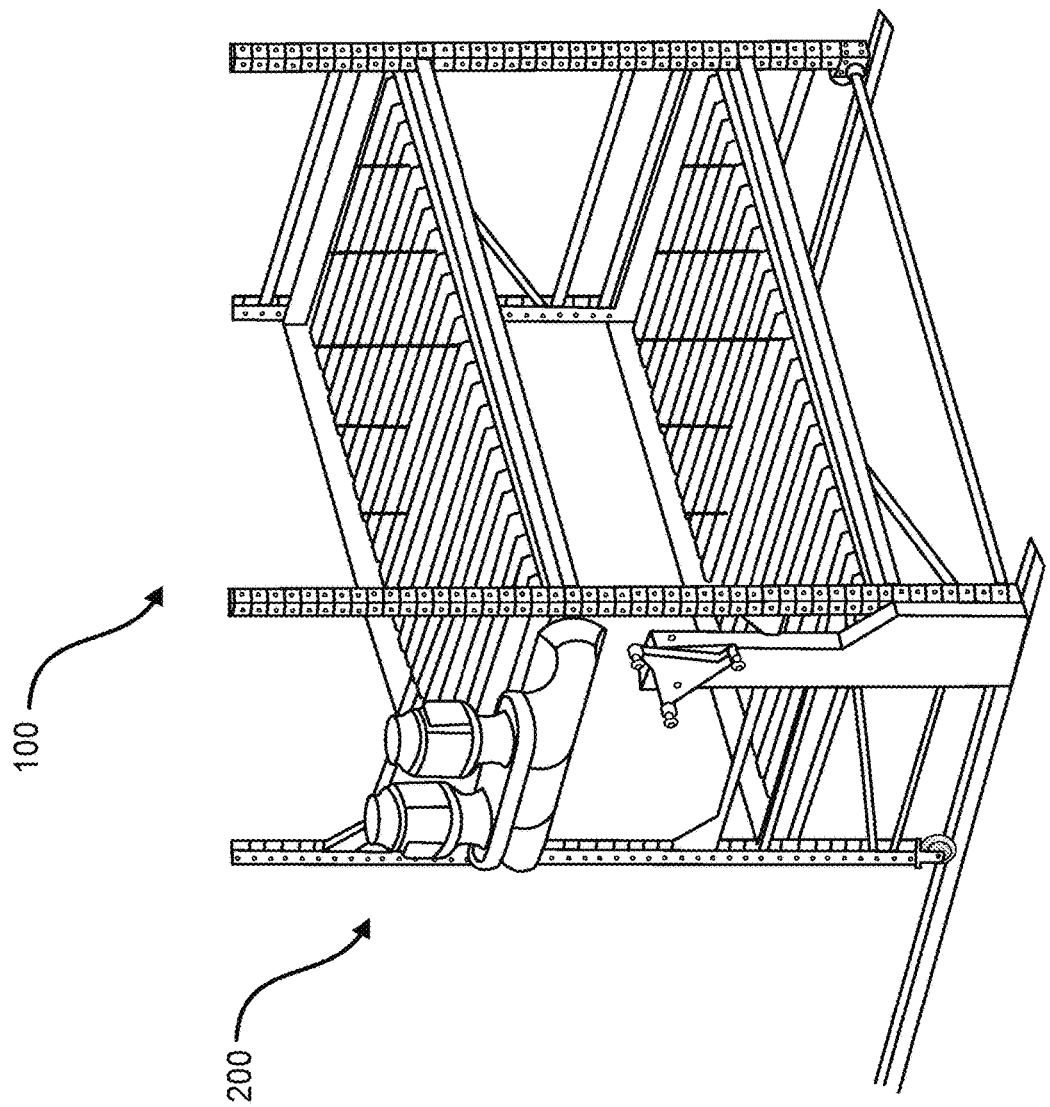
FIG. 1 illustrates a horticulture racking system, in accordance with various exemplary embodiments.

With reference now to FIG. 1, in various exemplary embodiments, a customizable horticulture racking system 100 comprises and/or may be coupled to or utilized with an air flow system 200. Although illustrated as being a part of customizable horticulture racking system 100, air flow system 200 is not limited in this regard. For example, any currently existing compatible shelving system or future developed compatible shelving systems may utilize air flow system 200 and are within the scope of this disclosure. In some exemplary embodiments, horticulture racking system comprises a system disclosed in U.S. Pat. No. 11,304,525.

The customizable horticulture racking system 100 may interface with and/or attach to or decouple from a scaffolding system (not shown). For example, an exemplary scaffolding system as disclosed in U.S. Patent Application Publication No. 2022-0098881 allows workers to safely access the various tiers of racking and service plants in horticulture racking system 100. Use of the scaffolding system eliminates the need to utilize a ladder, wheeled staircase, or scissor lift. Additionally, use of the scaffolding system allows access rows or aisles between vertical racks to be made narrower, leaving more space for racks and thus significantly improving the density of plants that are able to be grown in a particular space.

Horticulture racking system 100 may be formed from any suitable materials, for example aluminum, steel, high-strength plastics, and/or the like. Components may be machined, stamped, cast, and/or otherwise formed in any suitable manner or process. Additionally, components may be permanently and/or releasably coupled to one another and/or to other systems or devices via any suitable method, for example welding, brazing, and/or mechanical fasteners such as rivets, screws, bolts, and/or the like.

In various exemplary embodiments, horticulture racking system 100 comprises one or more each of a work deck, vertical upright brackets, decking brace, safety flag (fixed and/or telescoping) and a trim cover (fixed and/or telescoping). However, additional and/or fewer components may be utilized in certain embodiments, as suitable.

Figure 2:
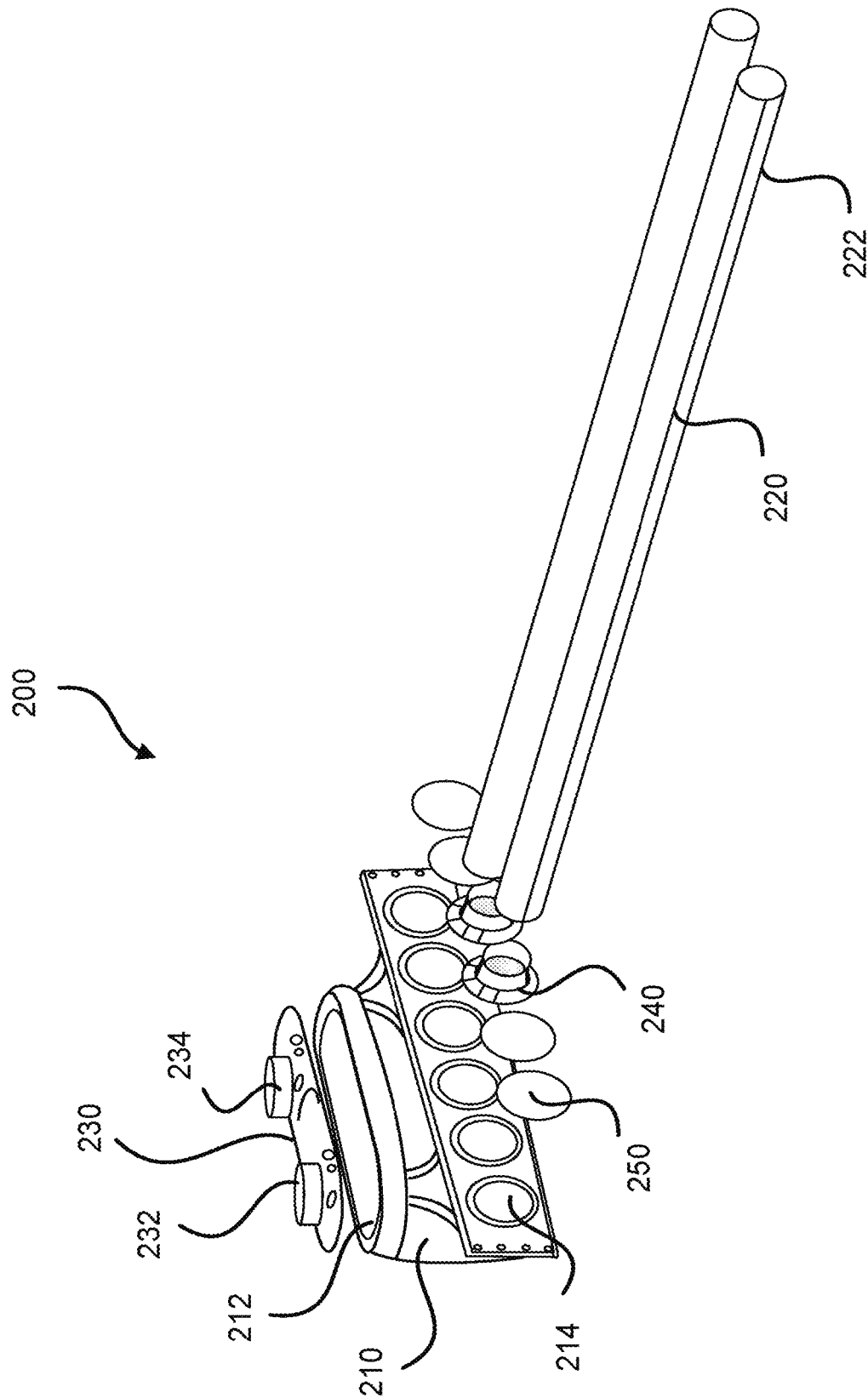
FIG. 2 illustrates an exploded view of an air flow system for use in a horticulture racking system, in accordance with various exemplary embodiments.

Referring now to FIG. 2, an exploded view of an exemplary air flow system 200 is illustrated, in accordance with various exemplary embodiments. The air flow system 200 is configured to provide enhanced air delivery to plants on various horticulture racking systems (e.g., horticulture racking system 100 from FIG. 1, or the like). The air flow system 200 may be configured to be coupled, or mounted, to a row of racks, such as a front row of racks or back row of racks, in accordance with various exemplary embodiments. In this regard, the air flow system 200 may include a manifold 210 configured to mount to the respective row of racks, in accordance with various exemplary embodiments. The manifold 210 may be mounted to a row of racks by any suitable means, such as mechanical fasteners (i.e., rivets, screws, bolts, and/or the like). In various embodiments, manifold 210 may be integral with a respective rack. In various embodiments, the manifold 210 comprises an inlet port 212 and a plurality of outlet ports 214.

In various embodiments, the air flow system 200 may further comprise ventilation socks 220. The manifold 210 is configured to be in fluid communication with the ventilation socks 220. In various embodiments, the ventilation socks 220 are made of a fabric or other thin material, or any other suitable material having a desired amount of porosity. In some exemplary embodiments, the sock material comprises one or more of nylon, polyester, vinyl, acrylonitrile butadiene styrene (ABS) plastic, etc. In this regard, an exit velocity of an airflow through the porosity of the sock material from the air flow system 200 may be varied by reconfiguring the air flow system 200 with another ventilation sock having a differing porosity, in accordance with various exemplary embodiments. Similarly, a porosity of the sock material may vary along a length of the row based on a respective design intent of the air flow system 200. Thus, in accordance with various embodiments, outlet velocity for the air flow system 200 may be customizable and/or reconfigurable. In various embodiments, the sock material may be rigid, or semi-rigid when not in use (i.e., when air is not flowing through it). In various embodiments, the sock material may be non-rigid when not in use and/or may be supported by brackets, clamps, braces, retaining loops, and/or the like.

In various embodiments, the ventilation socks 220 may further comprise a plurality of outlet apertures 222 spaced apart axially along a length of a row. In various embodiments, an outlet pattern may be equally spaced or include varying spacing. In various embodiments, the plurality of outlet apertures 222 may be in addition to a porous material or replace a porous material for the ventilation socks 220. In this regard, ventilation socks 220 may be made of more rigid material, such as a polymeric material (i.e., polyvinyl chloride (PVC)), a natural rubber, a synthetic rubber, a silicone, an elastomer, a thermoplastic, a thermoset, or the like. In various embodiments, variable spacing may be provided for horticulture applications where one area along a row of plants is denser than an adjacent area along a row of plants, or where one area has a plant with differing desired air flow relative to an adjacent plant. Thus, the air flow system 200 may be adaptable to various applications, in accordance with various embodiments.

In various embodiments, the inlet port 212 of the manifold 210 is configured to receive an in-line fan adapter 230. In this regard, an inlet flow may be controlled by reconfiguring the air flow system 200 with various in-line fan adaptors and/or various fans in order to input a desired air flow into the inlet port 212 of the manifold 210. The air flow system 200 may further be customizable and/or reconfigurable by adjusting or adapting an air flow input via a respective in-line fan adapter 230, in accordance with various embodiments. Although the in-line fan adapter 230 is configured to receive two fans therein, the present disclosure is not limited in this regard. For example, the in-line fan adapter 230 may be swappable for an in-line adapter configured to receive a single fan and/or an in-line adapter configured to receive more than two fans, in accordance with various embodiments. Similarly, in various embodiments, in-line adapter 230 may be utilized with a single fan (i.e., a fan in communication with inlet port 232 of in-line fan adapter 230) and a seal for the adjacent inlet (i.e., a seal for the inlet port 234 of the in-line fan adapter 230).

Similar to the inlet port 212 of the manifold 210, the plurality of outlet ports 214 of the manifold 210 may provide similar flexibility and adaptability to the air flow system 200. For example, the air flow system 200 may further comprise ventilation sock adapters 240 and/or exhaust restrictor plates 250. Thus, if only a single ventilation sock (e.g., ventilation sock 220) is desired, a single ventilation sock adapter (e.g., ventilation sock adapter 240) may be coupled to an outlet port in the plurality of outlet ports 214, and a remainder of outlet ports in the plurality of outlet ports 214 may have an exhaust restrictor plate (e.g., exhaust restrictor plate 250) coupled thereto, in accordance with various exemplary embodiments. The exhaust restrictor plate 250 and the ventilation sock adapter 240 may be mounted/coupled to a respective outlet port in the plurality of outlet ports 214 by any suitable means, such as via mechanical fasteners (i.e., rivets, screws, bolts, and/or the like), press-fit, adhesive, clamps, etc.

In various embodiments, ventilation socks 220 are configured to couple to the ventilation sock adapters 240 as described previously herein. Similarly, a respective fan is configured to be coupled to a respective inlet port (e.g., inlet port 232 or inlet port 234) of the in-line fan adapter 230 by any method previously described herein.

Figure 3:
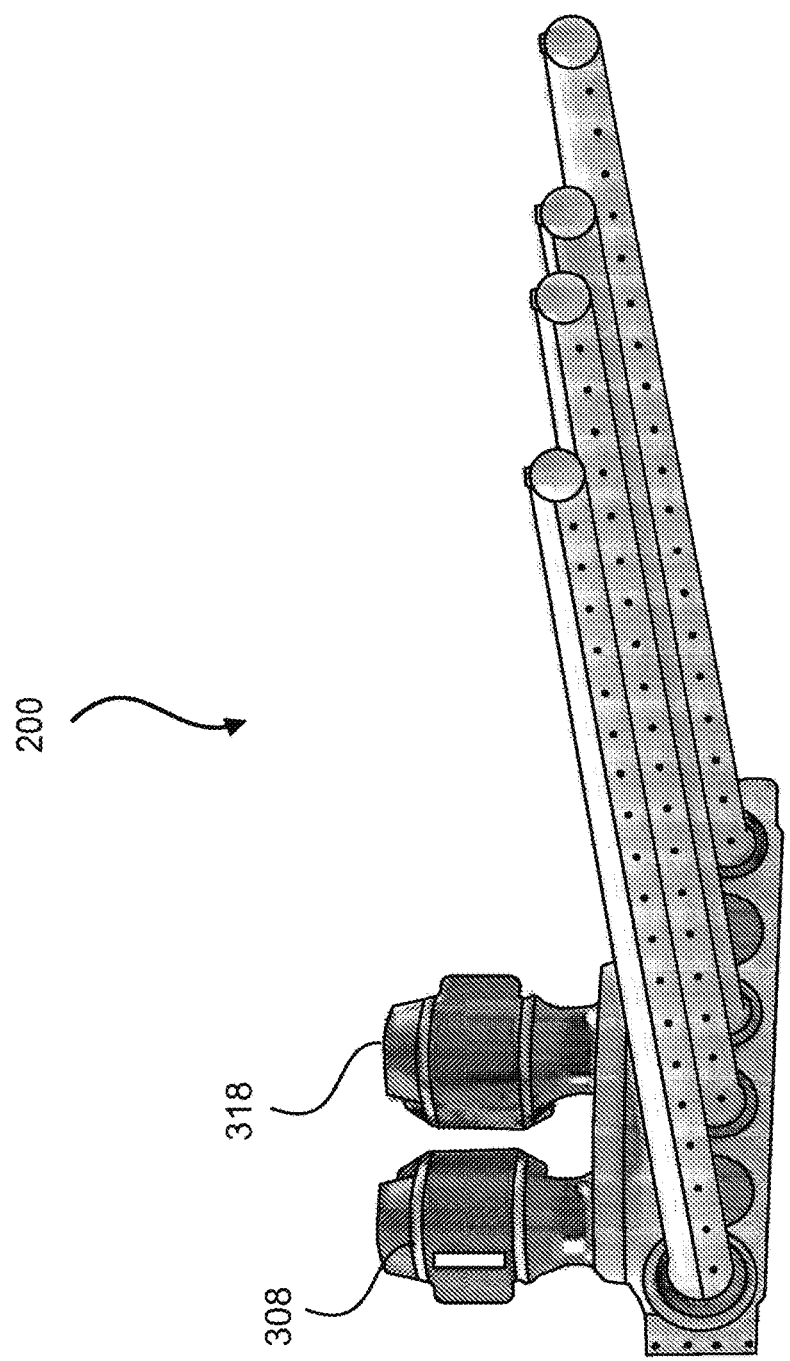
FIG. 3 illustrates an assembled air flow system for use in a horticulture racking system, in accordance with various exemplary embodiments.

Referring now to FIG. 3, a perspective view of an air flow system 200 is illustrated in an assembled state, in accordance with various exemplary embodiments. In various embodiments, the air flow system 200 further comprises a fan 308 coupled to the inlet port 232 of the in-line fan adapter 230 from FIG. 2. Similarly, the air flow system 200 may further comprise a fan 318 coupled to the inlet port 234 of the in-line fan adapter 230. As described previously herein, any suitable number of fans is within the scope of this disclosure. The fans 308, 318 may be any suitable fan, such as an electrical fan, an axial flow fan, a centrifugal fan, etc.

Figure 4:
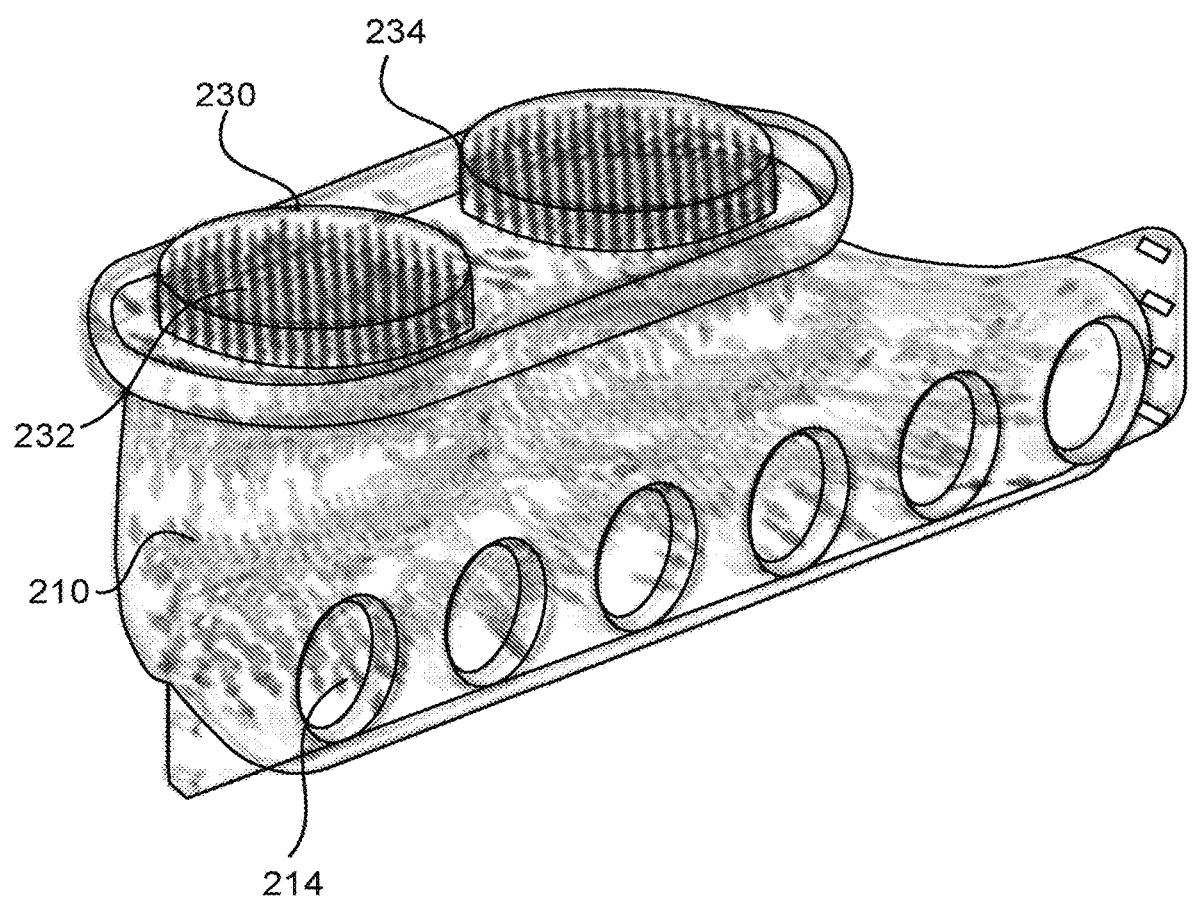
FIG. 4 illustrates a manifold for an air flow system, in accordance with various exemplary embodiments.

The fans 318, 318 may be in fluid communication with the plurality of outlet ports 214 of the manifold 210 from FIG. 2, in accordance with various exemplary embodiments. For example, as shown in FIG. 4, inlet port 232 and inlet port 234 of the in-line fan adapter 230 may be in fluid communication with each outlet port in the plurality of outlet ports 214 of the manifold 210, in accordance with various embodiments. Although illustrated in this manner, the present disclosure is not limited in this regard. For example, the inlet port 232 may be in fluid communication with a first set of outlet ports in the plurality of outlet ports 214 of the manifold and the inlet port 234 may be in fluid communication with a second set of outlet ports in the plurality of outlet ports 214, the first set of outlet ports and the second set of outlet ports being mutually exclusive, in accordance with various exemplary embodiments.

In various embodiments the air flow system 200 described herein may provide enhanced air filtration, humidity control/injection, $CO_2$ control/injection, and/or UV-A, UV-B, and/or UV-C sterilization. In various embodiments, the air flow system 200 described herein is customizable, adaptable, and/or reconfigurable based on specific applications.

Figure 5:
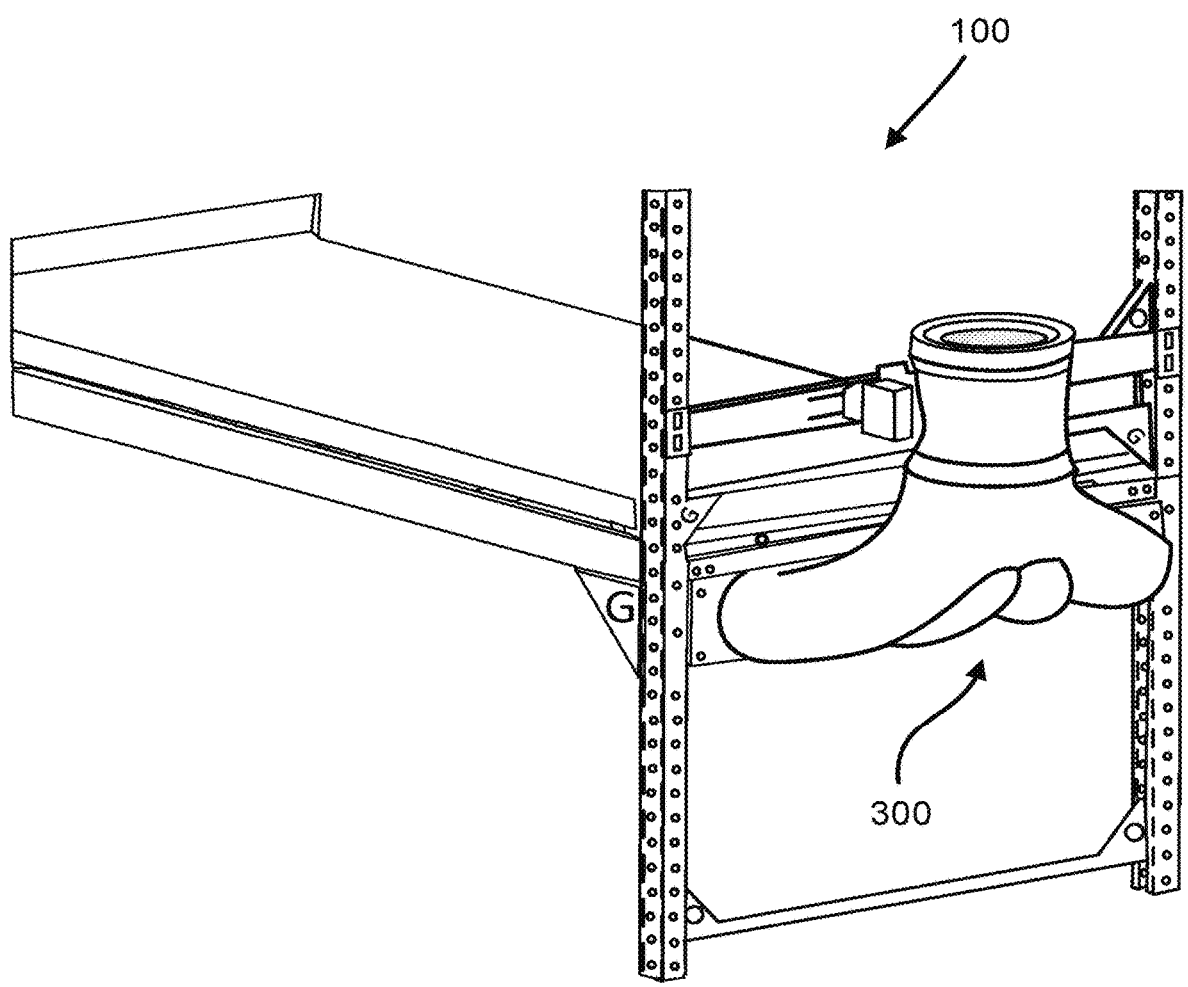
FIG. 5 illustrates a portion of a horticulture racking system having a portion of an air flow system coupled thereto, in accordance with various exemplary embodiments.

With reference now to FIG. 5, in various exemplary embodiments, the customizable horticulture racking system 100, as described herein, comprises and/or may be coupled to or utilized with an air flow system 300. The distance from a floor to the bottom of the air flow system 300 may be approximately 52 inches. In various embodiments, more than one air flow system 300 may be used. For instance, the distance between each air flow system 300 may be approximately 2.5 inches. Moreover, although illustrated as being a part of customizable horticulture racking system 100, air flow system 300 is not limited in this regard. For example, any currently existing suitable shelving system or future developed suitable shelving systems may utilize air flow system 300 and are within the scope of this disclosure.

Figure 6:
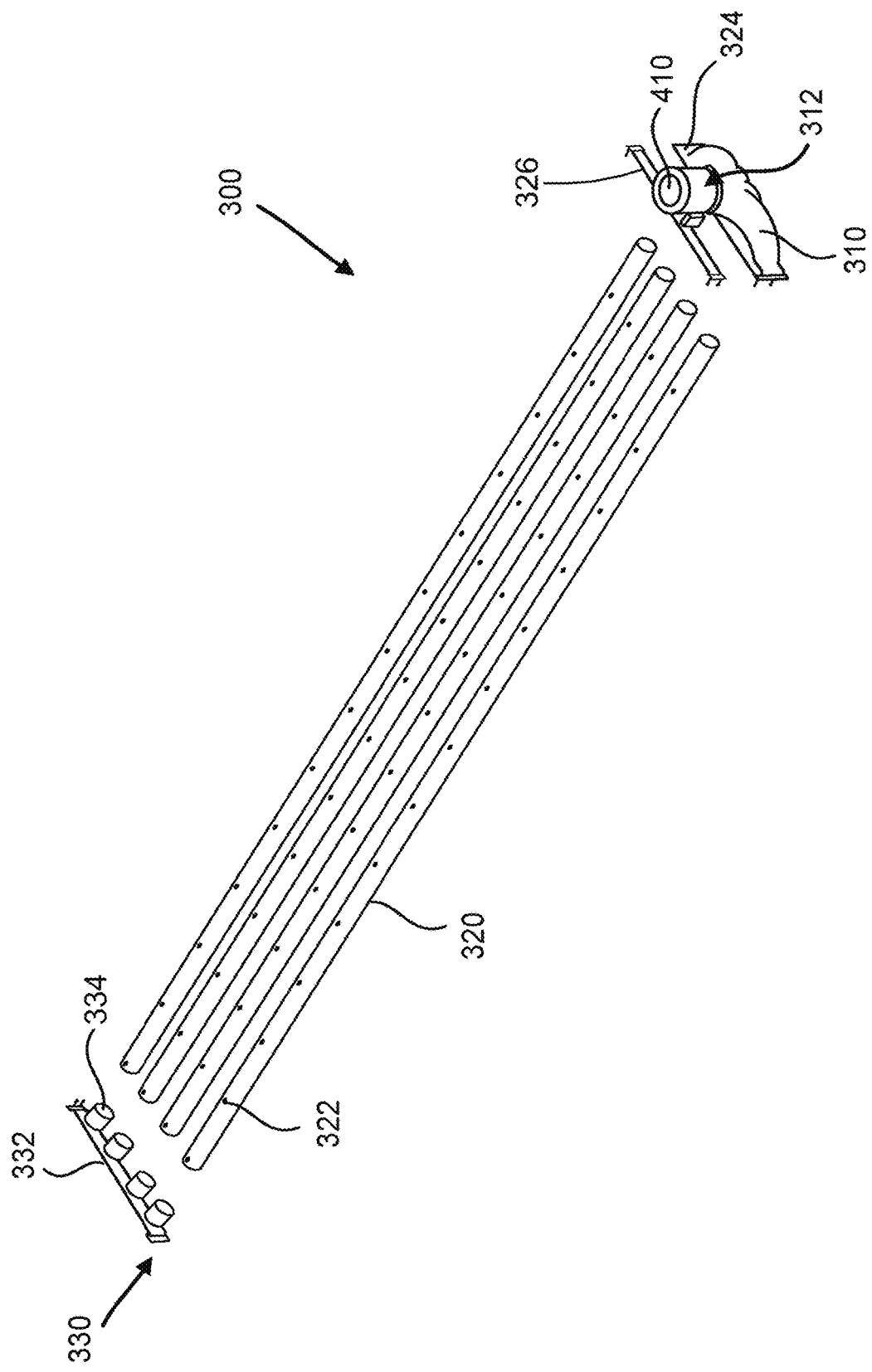
FIG. 6 illustrates an exploded view of an air flow system for use in a horticulture racking system, in accordance with various exemplary embodiments.
Figure 9:
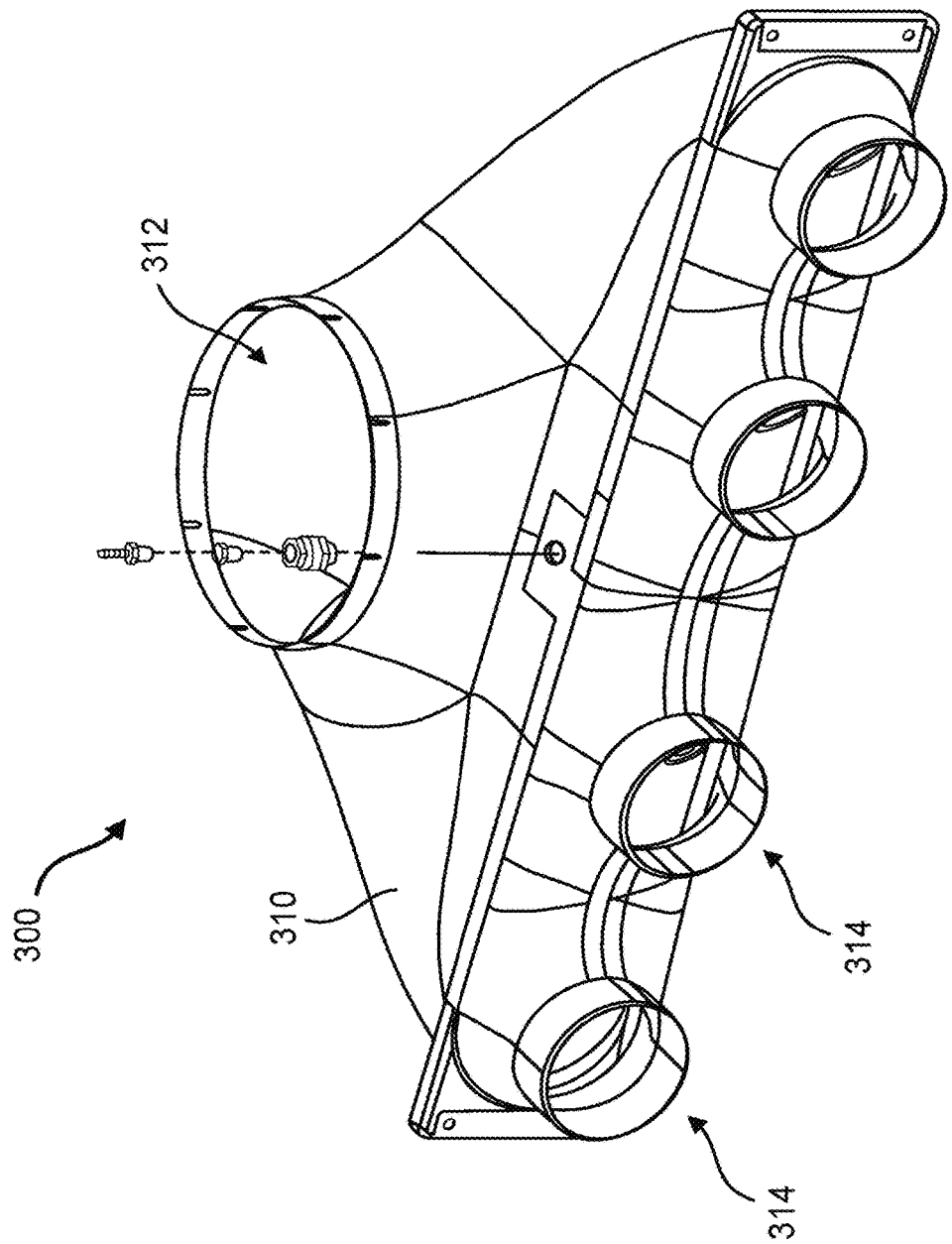
FIG. 9 illustrates a manifold for an air flow system, in accordance with various exemplary embodiments.

Referring now to FIG. 6, an exploded view of the air flow system 300 is illustrated, in accordance with various exemplary embodiments. The air flow system 300 is configured to provide enhanced air delivery to plants on various horticulture racking systems (e.g., horticulture racking system 100 from FIGS. 1 and 5, or the like). The air flow system 300 may be configured to be coupled, or mounted, to a row of racks, such as a front row of racks or back row of racks, in accordance with various exemplary embodiments. In this regard, the air flow system 300 may include a manifold 310 configured to mount to the respective row of racks, in accordance with various exemplary embodiments. The manifold 310 may be mounted to a row of racks by any suitable means, such as mechanical fasteners (i.e., rivets, screws, bolts, clamps, and/or the like). In various embodiments, manifold 310 may be integral with a respective rack. In various embodiments, the manifold 310 comprises an inlet port 312 and a plurality of outlet ports 314. A perspective view of an exemplary manifold 310 is illustrated in FIG. 9. The inlet port 312 of the manifold 310 may have an inner diameter of 306 millimeters. The plurality of outlet ports 314 of the manifold 310 may have diameter of 134-136 millimeters.

In various embodiments, the air flow system 300 may further comprise ventilation socks 320. The manifold 310 is configured to be in fluid communication with the ventilation socks 320. For instance, the ventilation socks 320 may be coupled to the plurality of outlet ports 314 of the manifold 310. In various embodiments, the ventilation socks 320 are made of a fabric, or any other suitable thin material having a desired amount of porosity. In some exemplary embodiments, the sock material comprises one or more of coated paper, nylon, polyester, vinyl, acrylonitrile butadiene styrene (ABS) plastic, etc. In this regard, an exit velocity of an airflow through the porosity of the sock material from the air flow system 300 may be varied by reconfiguring the air flow system 300 with another ventilation sock having a differing porosity material, in accordance with various exemplary embodiments. Similarly, a porosity of the sock material may vary along a length of the row based on a respective design intent of the air flow system 300. Thus, in accordance with various embodiments, outlet velocity for the air flow system 300 may be customizable and/or reconfigurable. In various embodiments, the sock material may be rigid, or semi-rigid when not in use (i.e., when air is not flowing through it). In various embodiments, the sock material may be non-rigid when not in use and/or may be supported by brackets, clamps, braces, retaining loops, and/or the like.

In various embodiments, the ventilation socks 320 may further comprise a plurality of outlet apertures 322 spaced apart axially along a length of a row. In various embodiments, an outlet pattern may be equally spaced or include varying spacing. In various embodiments, the plurality of outlet apertures 322 may be in addition to a porous material or replace a porous material for the ventilation socks 320. In this regard, ventilation socks 320 may be made of more rigid material, such as a polymeric material (i.e., polyvinyl chloride (PVC)), a natural rubber, a synthetic rubber, a silicone, an elastomer, a thermoplastic, a thermoset, or the like. In various embodiments, variable spacing may be provided for horticulture applications where one area along a row of plants is denser than an adjacent area along a row of plants, or where one area has a plant with differing desired air flow relative to an adjacent plant. For instance, as illustrated, there may be fourteen outlet apertures 322 on each ventilation sock 320. However, in various embodiments, there may be more or less outlet apertures 322 on each ventilation sock

Figure 10:
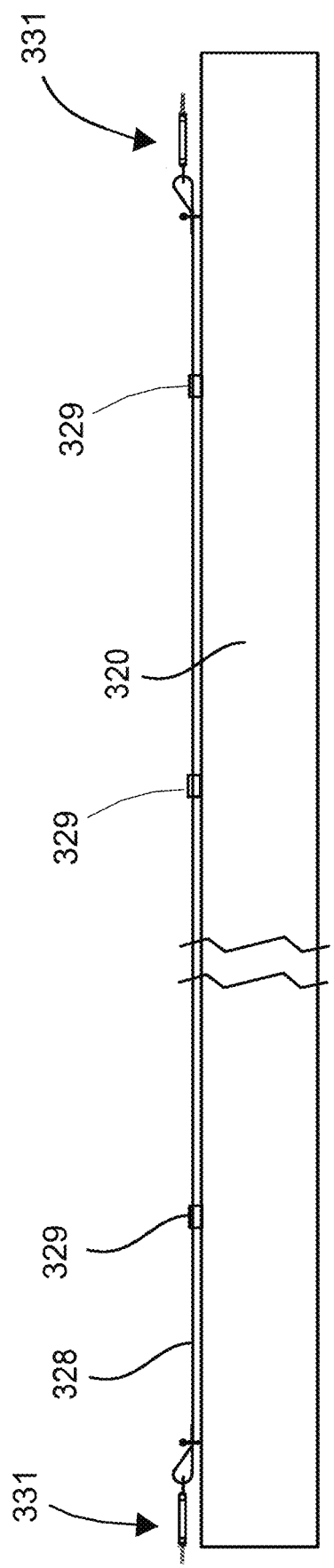
FIG. 10 illustrates a ventilation sock of an air flow system for use in a horticulture racking system, in accordance with various exemplary embodiments.

320. The outlet apertures 322 may be of varying size. The size and spacing may depend on the distance from the manifold 130 and/or the length of the ventilation socks 320. Further, the outlet apertures 322, as illustrated, may be disposed on a top surface (e.g., at "12 o'clock") or may be disposed on a bottom surface (e.g., at "6 o'clock"). In various embodiments, the outlet apertures 322 may be in a straight line across the top surface and/or may be disposed in multiple sets of outlet apertures 322 at various angles along the surface of the ventilation socks 320. Thus, the air flow system 300 may be adaptable to various applications, in accordance with various embodiments In various exemplary embodiments, ventilation socks 320 may be supported by and/or suspended along their length, for example by a metal wire rope of about 2-3 mm diameter passing through a series of loops spaced at intervals on the top of a ventilation sock 320. For instance, referring to FIG. 10, ventilation socks 320 may be supported by metal wire rope 328. The metal wire rope 328 may be threaded through a series of wire loops 329 in order to keep the wire in line and provide support across the length of the ventilation sock 320. The metal wire rope 328 may be tensioned, for example by coupling to a turnbuckle 331, in order to suspend ventilation sock 320 in a desired orientation. The turnbuckle 331 may be used to adjust/accommodate for small changes in the length of the horticulture racking 100. Additionally, the metal wire rope 328 may be coupled and decoupled from horticulture racking 100, for example by connecting/disconnecting the turnbuckles 331, in order to allow for quick and simple replacement of a ventilation sock 320. Moreover, ventilation sock 320 may pass through a series of loops hanging below a horticulture shelf in order to support ventilation sock 320.

Ventilation sock 320 may be sized as desired. In an exemplary embodiment, ventilation sock 320 has dimensions of about 140 mm in diameter and a length of about 10 meters. In another exemplary embodiment, ventilation sock 320 has dimensions of about 140 mm in diameter and a length of about 7.44 meters. In yet another exemplary embodiment, ventilation sock 320 has dimensions of about 140 mm in diameter and a length of about 15 meters. In various exemplary embodiments, the ventilation socks 320 may be manufactured in lengths between 7-10 meters and may be configured to be coupled together to accommodate for longer duct length requirements. Alternatively, the ventilation socks 320 may be configured to be cut for a shorter duct requirement. The ventilation socks 320 may be differing diameter, thickness, or material depending on the application.

The air flow system 300 includes a manifold bracket 324. The manifold bracket 324 is configured to couple with the manifold 310. The manifold bracket 324 may have a length of 1-2 meters, a height of 20 millimeters, and a thickness of 25 millimeters. The manifold bracket 324 may be manufactured with cold rolled steel. Further, the manifold bracket 324 is configured to couple with the customizable horticulture racking system 100. As such, the manifold bracket 324 facilitates coupling between the manifold 310 and the customizable horticulture racking system 100. Diagonal adapters may further be included and configured to further support the manifold 310. Particularly, the diagonal adapters may be disposed adjacent to where the manifold bracket 324 couples with the customizable horticulture racking system 100.

Figure 8:
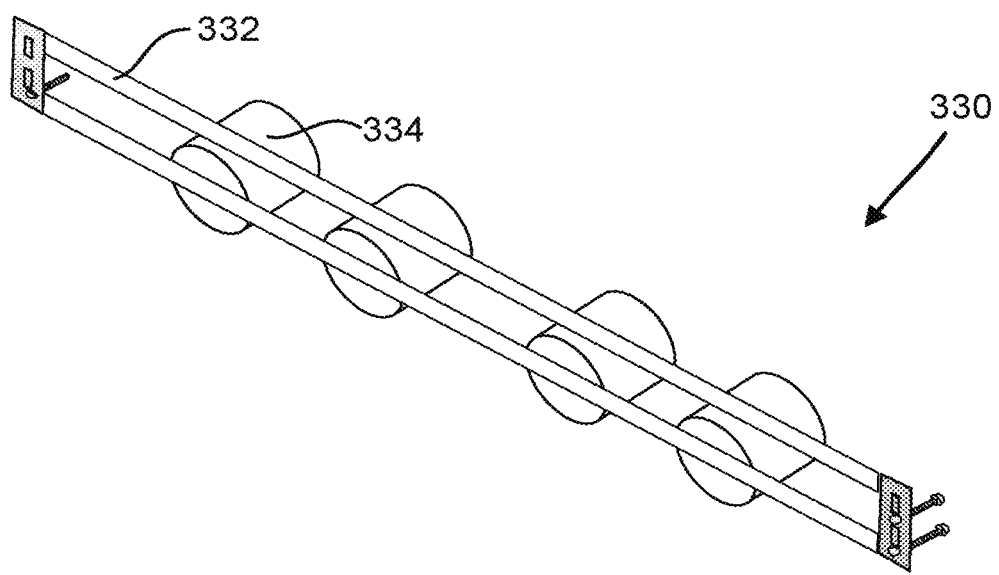
FIG. 8 illustrates a cap assembly of an assembled air flow system for use in a horticulture racking system, in accordance with various exemplary embodiments.

The air flow system 300 further includes an end cap assembly 330. The end cap assembly 330 comprises a cap bracket 332 and a plurality of duct caps 334. The plurality of duct caps 334 are configured to couple with the ventilation socks 320. For instance, the plurality of duct caps 334 are configured to cap the ventilation socks 320 at ends of the ventilations socks 320, the end being opposite the manifold 130. The duct caps 334 may have an outer diameter of 130-150 mm, corresponding with the diameter of the ventilation socks 320. The duct caps 334 may have a length of 128 mm and a thickness of 3 mm. The cap bracket 332 is configured to couple with the plurality of duct caps 334. The cap bracket 332 is configured to couple with the customizable horticulture racking system 100. As such, the cap bracket 332 facilitates coupling between the air flow system 300 and the customizable horticulture racking system 100. Additionally, end cap assembly can provide stability and support to ventilation socks 320. A perspective view of the end cap assembly 330 is illustrated in FIG. 8.

Figure 7:
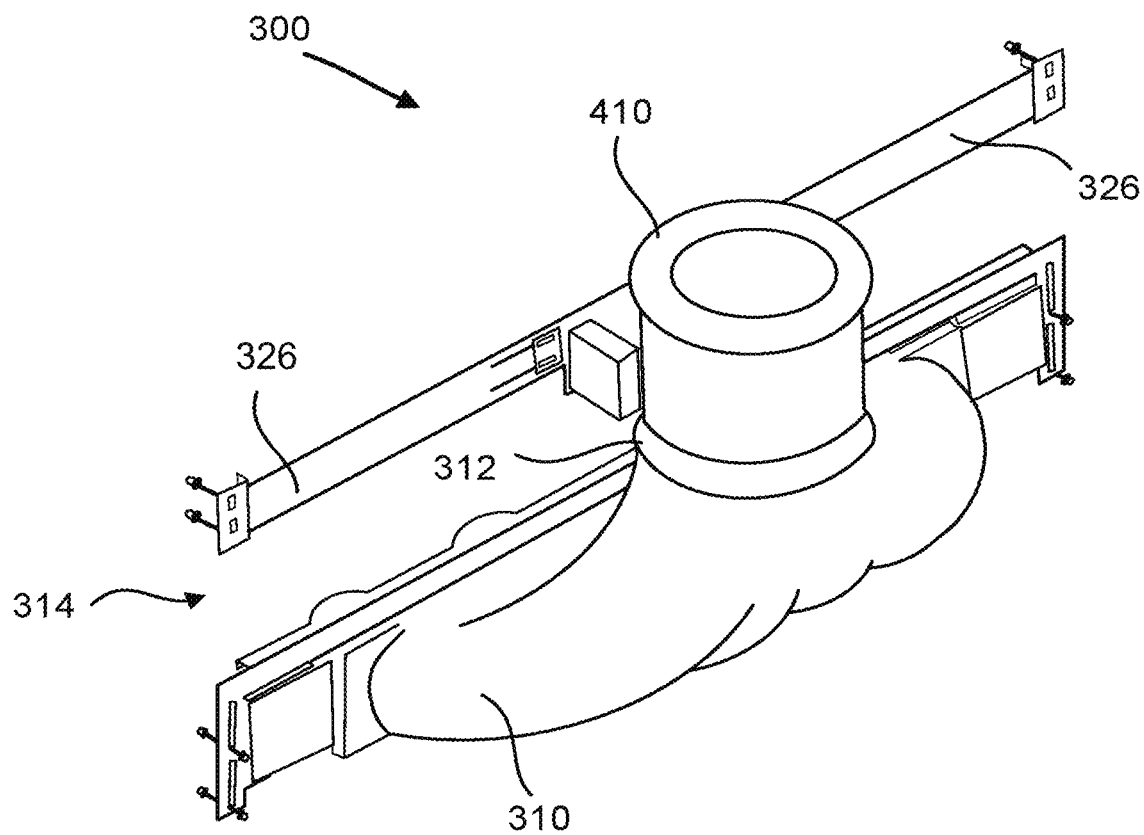
FIG. 7 illustrates an assembled air flow system for use in a horticulture racking system, in accordance with various exemplary embodiments.

Referring now to FIG. 7, a perspective view of an air flow system 300 is illustrated in an assembled state, in accordance with various exemplary embodiments. In various embodiments, the air flow system 300 further comprises a fan 410 coupled to the inlet port 312. The fan 410 may be any suitable fan, such as an electrical fan, an axial flow fan, a centrifugal fan, etc. For instance, the fan 410 may be a 12" standard fan. In contrast with the embodiment described with reference to FIGS. 2-4 (e.g., the air flow system 200), the air flow system 300 does not require an in-line fan adapter. Similarly, in various exemplary embodiments air flow system 300 does not comprise ventilation sock adapters and/or exhaust restrictor plates, as described previously herein with respect to air flow system 200. Accordingly, the manifold 310 is configured to attach directly to the fan 410, as well as directly to the ventilation socks 320 (e.g., fabric ducts).

The fan 410 may be in fluid communication with the plurality of outlet ports 314 of the manifold 310, in accordance with various exemplary embodiments. For example, as shown in FIG. 7, inlet port 312 may be in fluid communication with each outlet port in the plurality of outlet ports 314 of the manifold 310, in accordance with various embodiments.

The air flow system 300 includes a fan bracket 326. The fan bracket 326 is configured to couple with the fan 410. For instance, the fan bracket 326 may include side brackets configured to be in confronting relation with the sides of the fan 410 such that the fan 410 is supported by the fan bracket 326. The fan bracket 326 may have a length of 1-2 meters, a height of 80 millimeters, and a thickness of 20 millimeters. The fan bracket 326 may be a carbon steel rectangular tube. Further, the fan bracket 326 is configured to couple with the customizable horticulture racking system 100. As such, the fan bracket 326 facilitates coupling between the fan 410 and the customizable horticulture racking system 100.

In various embodiments described herein, the ventilation socks 320 are configured to be disposed between a horticulture rack and a grow light. In other various embodiments, an air flow system is mounted on a tray of the horticulture rack with ducts (e.g., ventilation socks) blowing up through a canopy of plants into grow lights. Additionally, in various embodiments, an exemplary air flow system may include an airflow return. In such a configuration, ducts (e.g., ventilation socks) may be disposed above the grow lights and configured to blow down through the plants, where the airflow is sucked into an airflow return disposed generally at the level of the tray. In this manner, air may be circulated to plants and then returned for further processing, filtration, and/or recirculation. Moreover, in various exemplary embodiments, an air flow system may provide both ventilation sock(s) and airflow return(s) in such a manner that (i) supplied air flows generally upward from ventilation socks, across plants, and into airflow returns, or (ii) supplied air flows generally upward from ventilation socks, across plants, and into airflow returns.

In various embodiments the air flow system 300 described herein may provide enhanced air filtration, humidity control/injection, $CO_2$ control/injection, and/or UV-A, UV-B, and/or UV-C sterilization. In various embodiments, the air flow system 300 described herein is customizable, adaptable, and/or reconfigurable based on specific applications.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A scaffold system for horticulture, the scaffold system comprising:
    a row of racks; and
    an air flow system configured to be supported by the row of racks, the air flow system comprising:
        a manifold having a manifold inlet and a manifold outlet in fluid communication with the manifold inlet;
        a fan coupled to the manifold inlet;
        a ventilation sock coupled to the manifold outlet; and
        an end cap assembly including a cap bracket for coupling to the row of racks, and a duct cap coupled to the cap bracket;
        wherein the duct cap is securable to the ventilation sock to cap off the ventilation sock opposite the manifold.

2. The scaffold system of claim 1, wherein the air flow system further comprises an in-line adapter disposed between the fan and the manifold inlet.

3. The scaffold system of claim 2, wherein the in-line adapter is coupled to the manifold at the manifold inlet, and the in-line adapter comprises an inlet port, wherein the fan is coupled directly to the inlet port of the in-line adapter.

4. The scaffold system of claim 3, wherein the fan comprises at least two fans and the in-line adapter comprises at least two of the inlet ports, each of the fans coupled to a respective one of the inlet ports, and wherein the manifold inlet comprises a single opening.

5. The scaffold system of claim 1, further comprising a ventilation sock adapter at the manifold outlet, wherein the ventilation sock is coupled directly to the ventilation sock adapter.

6. The scaffold system of claim 5, wherein the ventilation sock comprises a porous fabric.

7. The scaffold system of claim 6, wherein the ventilation sock is configured with a set of apertures to vent air therefrom.

8. The scaffold system of claim 1, wherein the ventilation sock is configured to be disposed between the row of racks and a grow light.

9. A method for providing airflow to a plant, the method comprising:
    coupling a manifold of an airflow system to a horticulture rack, the manifold having a manifold inlet and a manifold outlet in fluid communication with the manifold inlet;
    coupling an end cap assembly of the airflow system to the horticulture rack, the end cap assembly including a cap bracket and a duct cap coupled to the cap bracket;
    supporting the manifold and the duct cap assembly with the horticulture rack;
    coupling a fan to the manifold inlet;
    coupling one end of a ventilation sock to the manifold outlet and coupling an opposite end of the ventilation sock to the duct cap to cap off the ventilation sock; and
    operating the fan to circulate air through the ventilation sock and deliver the air to plants disposed on the horticulture rack.

10. The method of claim 9, wherein the ventilation sock comprises fabric, and wherein the ventilation sock is configured with a set of apertures to vent air therefrom.

11. The method of claim 9, wherein the ventilation sock is configured with a set of apertures disposed along a row of the plants.

12. The method of claim 9, further comprising disposing the ventilation sock along a row of the plants.

13. The method of claim 9, further comprising supporting the ventilation sock with the horticulture rack.

14. A scaffold system for horticulture, the scaffold system comprising:
    a row of racks; and
    an air flow system configured to be supported by the row of racks, the air flow system comprising:
        a manifold having a manifold inlet and at least two manifold outlets in fluid communication with the manifold inlet;
        a fan coupled to the manifold inlet;
        an in-line adapter disposed between the fan and the manifold inlet, wherein the in-line adapter is coupled to the manifold at the manifold inlet;

a ventilation sock coupled to each of the manifold outlets;

an end cap assembly including a cap bracket for coupling to the row of racks, and at least two duct caps coupled to the cap bracket in spaced-apart arrangement;

wherein the duct caps are securable to respective ones of the ventilation socks to cap off the ventilation socks opposite the manifold.

15. The scaffold system of claim 14, further comprising a ventilation sock adapter at each of the manifold outlets, wherein the ventilation socks are coupled directly to respective ones of the ventilation sock adapters.

16. The scaffold system of claim 15, further comprising:

a pair of flexible elongate members coupled between the manifold and the cap bracket; and a plurality of loops disposed along each of the ventilation socks in longitudinally spaced arrangement;

wherein the flexible elongate members extend through the plurality of loops of respective ones of the ventilation socks to support the ventilation socks at the row of racks.

17. The scaffold system of claim 16, further comprising a manifold bracket coupled to the manifold and to the row of racks, wherein the manifold bracket supports the manifold at the row of racks.

18. The scaffold system of claim 17, further comprising a fan bracket coupled to the fan and to the row of racks, wherein the fan bracket supports the fan and is spaced vertically from the manifold bracket.

19. The scaffold system of claim 14, wherein the ventilation socks comprise a porous fabric.

20. The scaffold system of claim 19, wherein the ventilation socks each comprise a set of apertures to vent air therefrom.

* * * * *